United States Patent
Garcea et al.

(10) Patent No.: US 7,710,744 B2
(45) Date of Patent: May 4, 2010

(54) METHOD FOR CONTROLLING A FULL BRIDGE CONVERTER WITH A CURRENT-DOUBLER

(75) Inventors: Giovanni Garcea, Milan (IT); Massimo Ghioni, Milan (IT); Christian Beia, Arsago Seprio (IT); Stefano Saggini, San Donato Milanese (IT); Francesco Villa, Milan (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 778 days.

(21) Appl. No.: 11/249,125

(22) Filed: Oct. 11, 2005

(65) Prior Publication Data

US 2006/0077695 A1   Apr. 13, 2006

(30) Foreign Application Priority Data

Oct. 11, 2004   (EP)   .................................. 04425760

(51) Int. Cl.
*H02M 3/332* (2006.01)
(52) U.S. Cl. .......................... 363/17; 363/56.02; 363/98
(58) Field of Classification Search .................. 363/16, 363/17, 56.02, 95, 98, 131, 132
See application file for complete search history.

(56) References Cited

U.S. PATENT DOCUMENTS

| | | | | |
|---|---|---|---|---|
| 4,654,770 A | * | 3/1987 | Santurtun et al. ............. 363/17 |
| 4,905,135 A | * | 2/1990 | Unehara et al. ................ 363/98 |
| 5,285,368 A | * | 2/1994 | Ishikawa .................. 363/21.05 |
| 5,625,539 A | * | 4/1997 | Nakata et al. .................. 363/17 |
| 5,654,880 A | * | 8/1997 | Brkovic et al. ................. 363/17 |
| 6,038,142 A | * | 3/2000 | Fraidlin et al. ................ 363/17 |
| 6,259,615 B1 | * | 7/2001 | Lin .............................. 363/98 |
| 6,400,580 B1 | | 6/2002 | Bowman et al. |
| 6,469,481 B1 | | 10/2002 | Tateishi |
| 6,856,526 B2 | * | 2/2005 | Elek et al. ...................... 363/86 |
| 6,961,253 B1 | * | 11/2005 | Cohen .......................... 363/89 |
| 7,158,392 B2 | * | 1/2007 | Hosokawa et al. ........ 363/21.06 |
| 7,319,600 B2 | * | 1/2008 | Lee et al. .................. 363/21.02 |
| 7,394,209 B2 | * | 7/2008 | Lin et al. ...................... 315/247 |
| 2004/0136209 A1 | | 7/2004 | Hosokawa et al. |
| 2007/0133232 A1 | * | 6/2007 | Sigamani ..................... 363/16 |

OTHER PUBLICATIONS

Partial European Search Report, EP05022044. Jun. 19, 2006.

* cited by examiner

*Primary Examiner*—Adolf Berhane
(74) *Attorney, Agent, or Firm*—Lisa K. Jorgensen; Paul F. Rusyn; Graybeal Jackson LLP (57) ABSTRACT

A method controls a Full Bridge converter with a Current-Doubler of the type including at least a first and a second half-bridges of diodes connected to respective control transistors. The method includes detecting a reference value, comparing, instant by instant, the reference value with an output voltage value of the converter, and carrying out a switching from a transfer phase to an energy recirculation phase in correspondence with instants when the output voltage value reaches the reference value.

16 Claims, 11 Drawing Sheets

FIG.14

METHOD FOR CONTROLLING A FULL BRIDGE CONVERTER WITH A CURRENT-DOUBLER

PRIORITY CLAIM

The present application claims the benefit of European Patent Application No. 04425760.8, filed Oct. 11, 2004, which application is incorporated herein by reference in its entirety.

TECHNICAL FIELD

Embodiments of the present invention relates generally to a method for controlling a Full Bridge converter with a Current-Doubler.

BACKGROUND

As it is well known, the classical modulation PSM consists in driving two half-bridges of a Full-Bridge converter with fixed duty-cycle, of value close to 50% so as to have symmetrical losses by conduction between the four switches of a primary winding. In any case the duty-cycles of the two half-bridges must be as close as possible since, in case of the use of a Current-Doubler with a secondary winding, an asymmetry thereof would reflect in a difference between the currents of the filter inductances.

Figure 1:
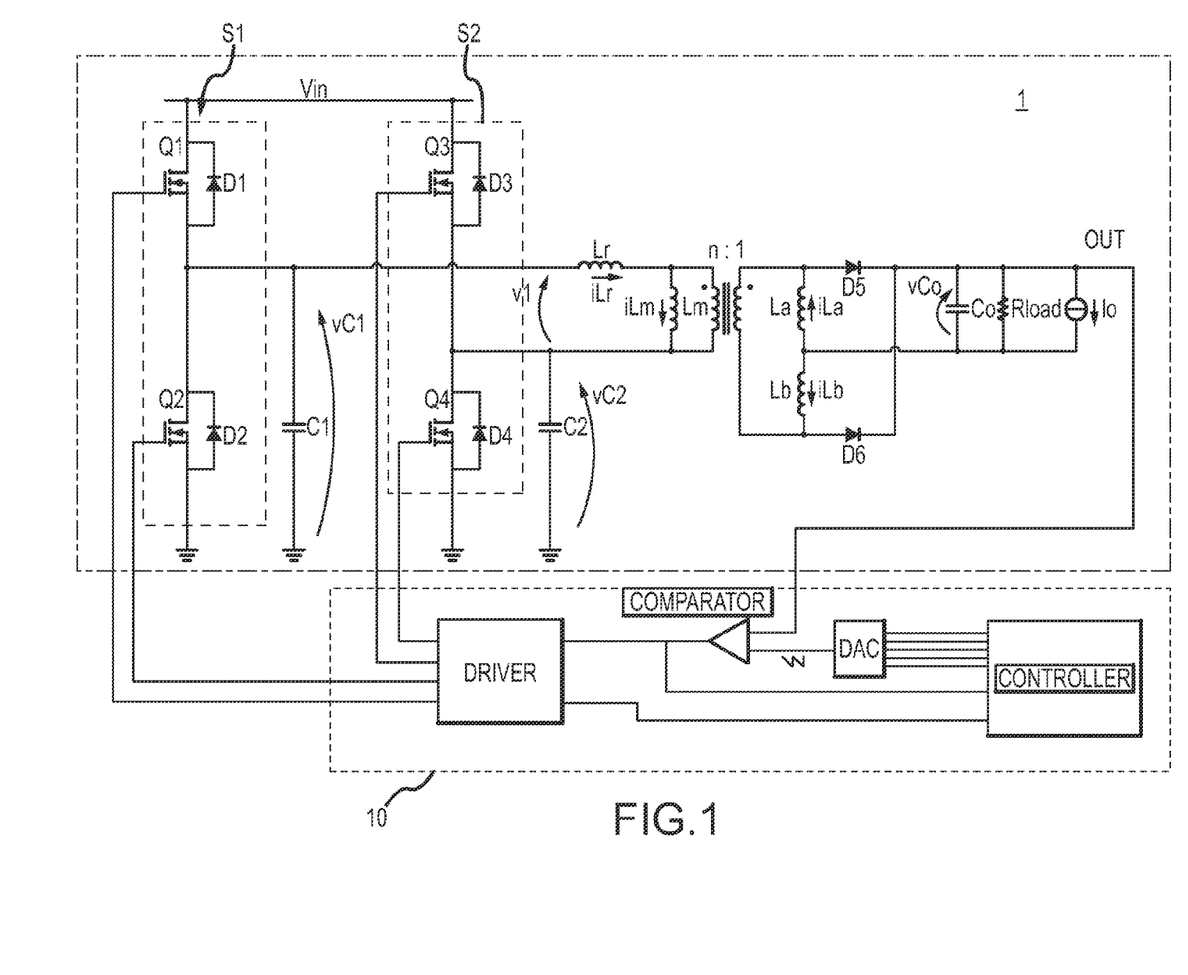
FIG. 1 schematically shows a Full Bridge converter equipped with a digital controller according to an embodiment of the invention.

By turning on the two diagonals of the two half-bridges alternatively, for each switch period four main operation states of the Full-Bridge converter are obtained. With reference to FIG. 1, in the two states wherein a high-side switch (Q1 or Q3) of a half-bridge (S1 or S2) and a corresponding low-side switch (respectively Q4 or Q2) of the other half-bridge (S2 or S1) of the Full-Bridge converter 10 are on, i.e. the turn-on of one of the two diagonals causes energy transfer towards an output terminal OUT.

The other two states occur when either the two high-side switches (Q1 and Q3) or the two low-side switches (Q2 and Q4) are on. In this situation there is no energy transfer towards the output terminal and the current of the primary recirculates in the upper or lower mesh of the Full Bridge converter 1.

By modulating the ratio between the duration of the transfer periods and the duration of the recirculation periods, a variation of the output voltage is obtained. This is exactly the mechanism exploited in the converters realized according to the prior art to obtain the output voltage regulation.

In a system with analog control the output voltage, as a regulated variable, is fed back at the input of an error amplifier, so as to obtain a control variable which allows shifting in phase the two waves PWM controlling the two half-bridges S1 and S2.

A classical digital controller converts the output voltage into a digital magnitude to obtain, downstream of a digital regulator, a quantized phase shift between the two waves PWM.

As it is known, the precision required by the application determines the resolution of an input connected A/D converter.

So as not to have evident limit cycles, the digital modulator PWM should exhibit a higher resolution than that previously calculated. In practice the number of discrete phase shift values the A/D converter is supplied with is determined.

The solutions adopted up to now are based on current-mode control. For such known solutions it occurs that the analog front-end appears to be inadequate due to circuit complexity. The voltage control systems are instead simpler, but they cannot provide a current-sharing control.

In fact the only limitation the electric network realizing the Current-Doubler imposes is that the sum of the currents in the two filter inductances is equal to the load current. It is evident that any asymmetry of the system would lead to having different currents.

Thus, up to now, the Current-Doubler has been used in systems with current control. If only a control with peak current is considered (but this is also valid for controls with mean current) this implies the need of reading the absolute value of two currents by means of a trans-impedance circuit, and then of comparing them with an analog voltage reference suitably generated by the controller.

To such purpose, if the controller is of the digital type, a D/A converter is used.

SUMMARY

An embodiment of the present invention provides a method for controlling a Full Bridge converter with a Current-Doubler, having such structural and functional characteristics as to overcome the limits and the drawbacks still affecting the devices realized according to the prior art.

Another embodiment of the invention provides a method for controlling a peak value of an output voltage of the Full Bridge converter with a Current-Doubler by using a reference voltage.

More specifically, in this embodiment of the invention, the reference voltage is regulated in such a way to control the difference between the currents flowing in inductances of the Current-Doubler.

An embodiment of the invention relates to a method for controlling a Full Bridge converter with a Current-Doubler of the type including at least a first and a second half-bridges of diodes connected to respective control transistors. The method includes detecting a reference value, comparing, instant by instant, the reference value with an output voltage value of the converter, and carrying out a switching from a transfer phase to an energy recirculation phase in correspondence with instants when the output voltage value reaches the reference value.

Another embodiment of the invention makes reference to a digital controller for a Full Bridge converter with Current-Doubler.

Yet another embodiment of the invention particularly, but not exclusively, relates to a method for controlling an output voltage of the Full Bridge converter by regulating the difference of the currents flowing in a pair of inductors of the Current Doubler block by regulating a reference voltage.

BRIEF DESCRIPTION OF THE DRAWINGS

The characteristics and advantages of the method and of the digital controller according to the invention will be apparent from the following description of embodiments thereof given by way of indicative and non-limiting example with reference to the annexed drawings.

In the drawings.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Referring to FIG. 1 already described in relation to the prior art, 10 globally and schematically indicates a digital controller associated with a Full Bridge converter.

Advantageously according to an embodiment of the invention, the digital controller 10 realizes the regulation of the output voltage according to the control method according to an embodiment of the present invention.

In particular, a reference value supplied by a D/A converter is compared instant by instant with the output voltage. During the energy transfer periods, i.e. during the turn-on of the control transistors Q1 and Q4 or Q2 and Q3 of the Full Bridge converter 1, the voltage increases. Thus the instants are used wherein the output voltage reaches the reference value for switching from a transfer phase to an energy re-circulation phase, i.e. the transistors Q1 and Q3 or Q2 and Q4 are turned on. In such way a control is realized of the peak voltage. The two diagonals must be activated in an alternate way, i.e. the energy transfer cannot be realized with the turn-on of the transistors MOS of the same diagonal for two consecutive times.

Figure 2:
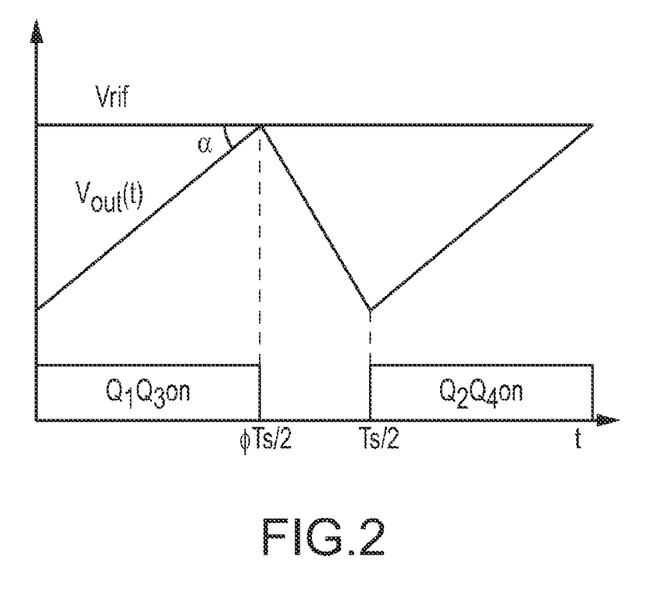
FIGS. 2 and 3 schematically show control signals of control MOS transistors comprised in the Full Bridge converter of FIG. 1 according to an embodiment of the invention.

Referring to FIG. 2, the switches occur in a synchronous way when the output voltage overcomes the reference, but asynchronously with a system clock signal; in this way having a discrete number of suppliable phase shifts and use of a digital modulator PWM is avoided.

The switch instead from recirculation periods to energy transfer periods occurs in a synchronous way with the system clock. The two switches at issue will occur, respectively, at the beginning and in the middle of the switching period. In this way an absolutely fixed switching frequency is obtained.

Even the energy recirculation intervals should occur in an alternate way. Definitively, the driving of the MOS transistors should cyclically occur in one of the following ways:

turning-on of Q1 and Q4; turning-on of Q1 and Q3; turning-on of Q2 and Q3; turning-on of Q2 and Q4;
turning-on of Q1 and Q4; turning-on of Q2 and Q4; turning-on of Q2 and Q3; turning-on of Q1 and Q3;

Under the conditions for which the output voltage ripple is almost completely determined by the current ripple through the parasitic resistance of the capacitance itself (ESR), controlling the voltage peaks means controlling the peak of the sum of the two currents in the filter inductances.

The output voltage variation causes a change of the interruption instant of the energy transfer period. This action depends on the slope of the positive ripple ramp of the voltage, according to the relation:

$$\delta v_{out} = -\delta\phi \cdot \tan(\alpha) \quad (1)$$

where $\delta\phi$ is the variation of the phase shift between the half-bridges e $\tan(\alpha)$ is the slope of the positive ripple of the output voltage:

$$\tan(\alpha) = \left(\frac{V_{in}}{n} - 2V_{out}\right)\frac{ESR \cdot T_s}{2L} \quad (2)$$

Figure 3:
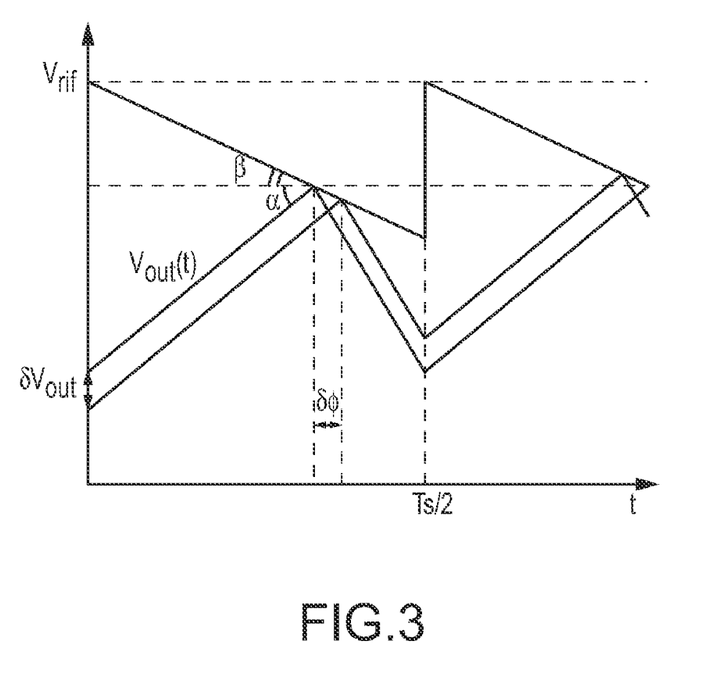

To be able to control the modulator gain it is necessary to modify the crossing slope of the output voltage with the reference. To this purpose, through the converter DAC, frequency ramps $2f_{sw}$, can be generated, as shown in FIG. 3. In reality, in so doing, the ramps will exhibit a stepped progress, possibly beveled by the capacitive load at the output of the DAC. By changing the (1) the gain of the modulator Gm is obtained:

$$Gm = \frac{\delta v_{out}}{\delta\phi} \quad (3)$$
$$= -(\tan(\alpha) + \tan(\beta))$$

where $\tan(\beta)$ represents the compensation ramp slope.

Figure 4:
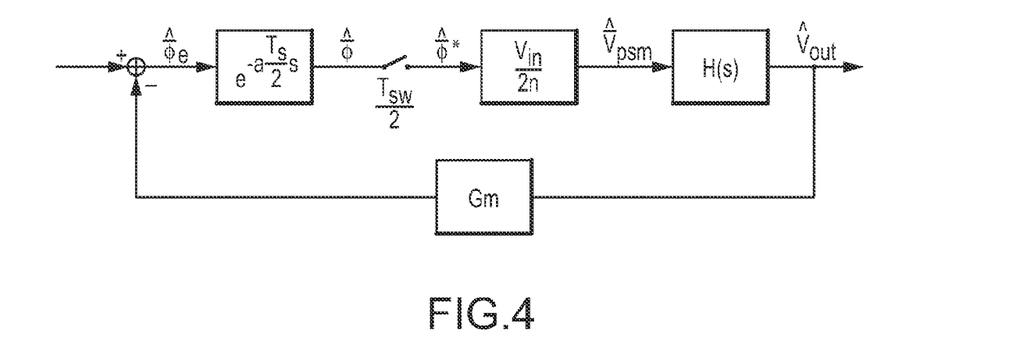
FIG. 4 schematically shows, in blocks, a control loop suitable to implement the control method according to an embodiment of the invention.

Referring to FIG. 4, the control loop of the output voltage is schematically and in blocks shown. The difference between the two phases does not affect the output voltage when supposing, in an approximation aim, that the current sharing exhibits dynamics orthogonal to that of common mode.

Moreover, the influence of the slope of the voltage ripple (2) on the gain is as much smaller as much higher the value $\tan(\beta)$ is with respect to the $(\alpha)$.

One result of this control method is the attainment of the highest speed of response to the transients. While in an analog voltage-mode control the sole thing which is decided is the phase shift between the waves PWM of the half-bridges, and thus the controller acts once for cycle, in the controller according to an embodiment of the invention the durations of the two energy transfer periods are determined independently, thus the controller acts at a frequency equal to $2f_s$.

Figure 5:
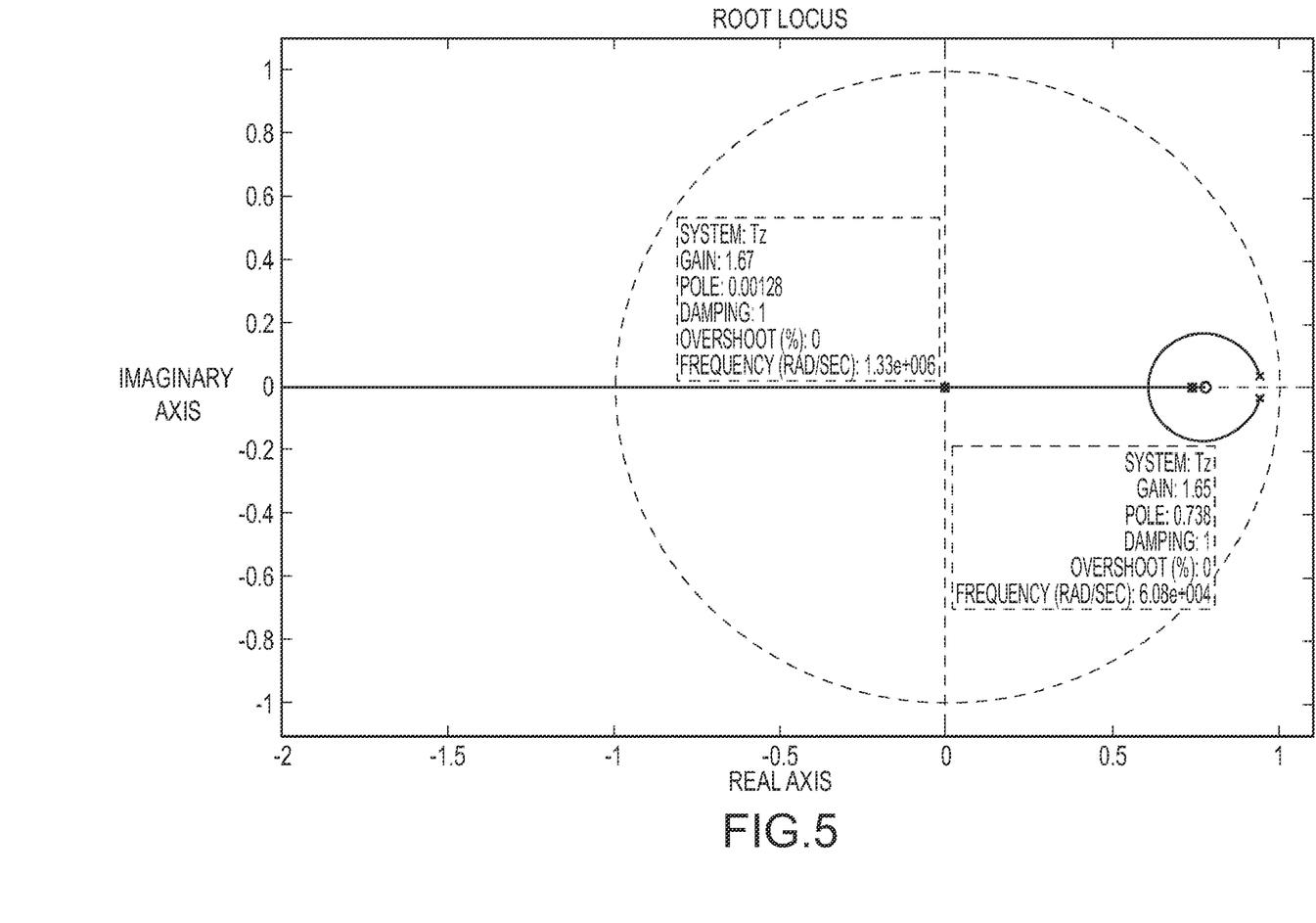
FIGS. 5 and 6 show the representations of the root locus of the control loop of FIG. 4 according to an embodiment of the invention.

The study of the root locus is an instrument for the evaluation of the system dynamic performances. In particular, it is possible to understand the highest value that can be obtained by the closed loop band. This result is obtained when the high frequency pole reaches the unitary circle centre. Referring to FIG. 5, from the calibration of the place of the roots, the multiplication factor is obtained from the loop gain which allows this position for the closed loop pole to be obtained. From the same analysis also the position of the other pole is obtained, which shifts towards zero when the multiplication factor increases. A control of the Deadbeat type is roughly approximately obtained, wherein against a small signal disturbance, the system reacts going back to the steady condition in a single switching period. The closed loop band limit can overcome the limits allowed by the classic analog voltage-mode.

If the system is disturbed by a big signal, as a transient can be due to the turning-on and to the turning-off of a load, the output voltage cannot meet the reference during the interval of a half-period. In this case the dynamics go out from the linear speed since the regulator is not able to supply the phase shift required. Under these conditions the converter operates with open loop and goes back to a steady condition at the highest speed allowed. When the output voltage goes back to cross the reference the regulator starts again to operate in linear area, performing the last part of the transient with the described dynamics. A non linear digital controller has thus been realized without quantization effects.

Afterwards, the influence has been evaluated of the time constant ESR*C on the loop stability. The zero introduced by the parasitic resistance of the output capacitance is in fact exploited to stabilize the control loop. This philosophy, may be evaluated to determine limits beyond which this control technique cannot be used any more.

Figure 6:
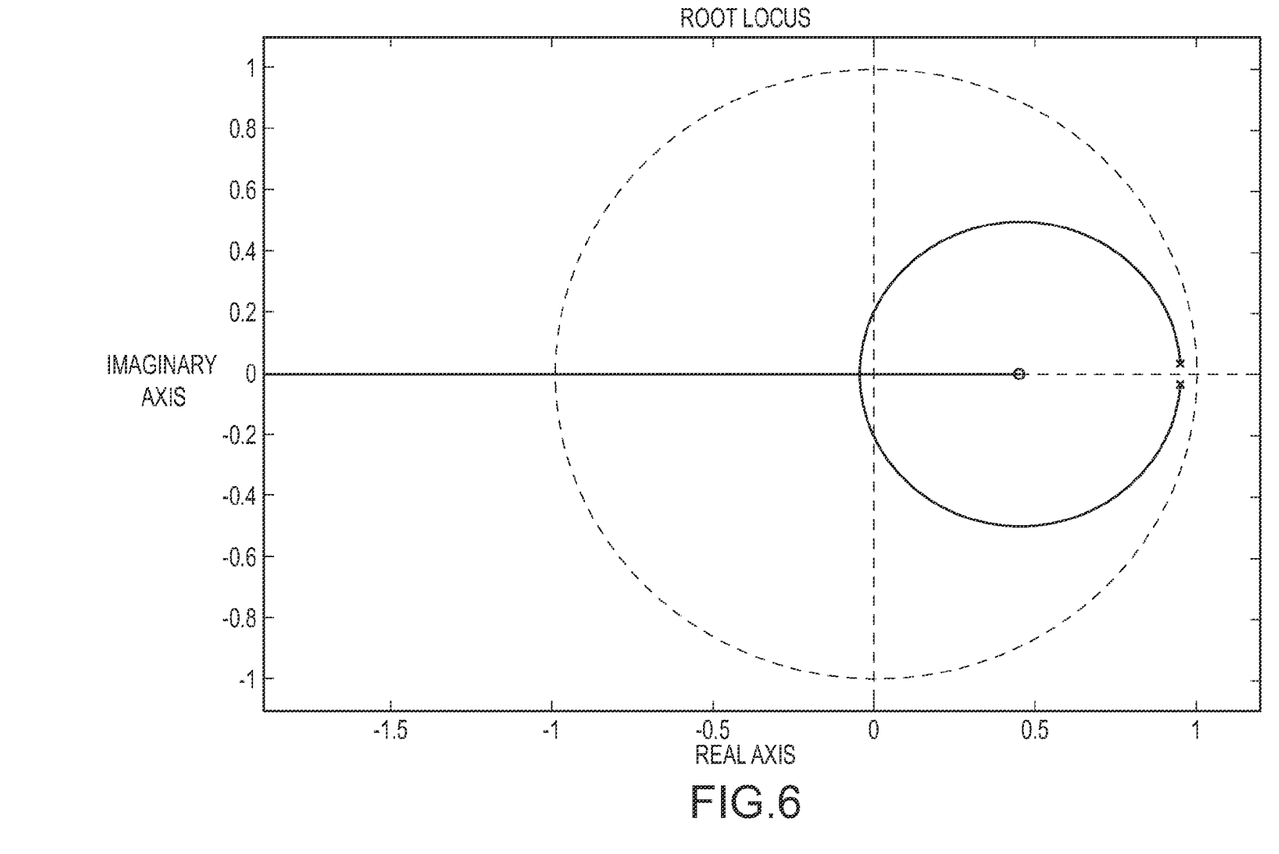

By evaluating the root locus when the ESR varies diagrams are obtained as the one of FIG. 6, obtained by reducing the value of the time constant ESR*C. It is noted how the migration of the poles in the Gauss plane follows a higher radius circumference. This would lead to instability if such circumferences crossed the unitary radius circle.

Under the conditions described instead the system is still stable, although responses without over-oscillations cannot be obtained. This can be deduced from the fact that no gain values exist for which the high frequency pole is in the centre of the Gauss plane.

It is however possible to follow this track for example within the applications wherein the output voltage is of 48V and the sole capacitors that can be used are the aluminium electrolytes, which exhibit such an ESR that the root locus has the shape described in FIG. 5 or in FIG. 6.

The method according to an embodiment of the invention also provides a regulation of the difference between the currents.

In particular, to ensure that the currents in the two inductances in the Current-Doubler do not diverge, the minimal datum which serves is an indication on the difference between the two currents. As it is known, connecting a RC network having the same time constant L/R given by the inductance and by its parasitic resistance in parallel to an inductance, leads to having, across the capacitance of the RC network, a voltage proportional to the current value in the inductance. In the Current-Doubler the two inductances, and thus the two inserted RC networks, share a node, the output. It is evinced thus that the voltage difference between the two central nodes of the RC networks is a triangular wave having double frequency with respect to that of switching and being proportional, instant by instant, to the difference of the two currents.

Figure 7:
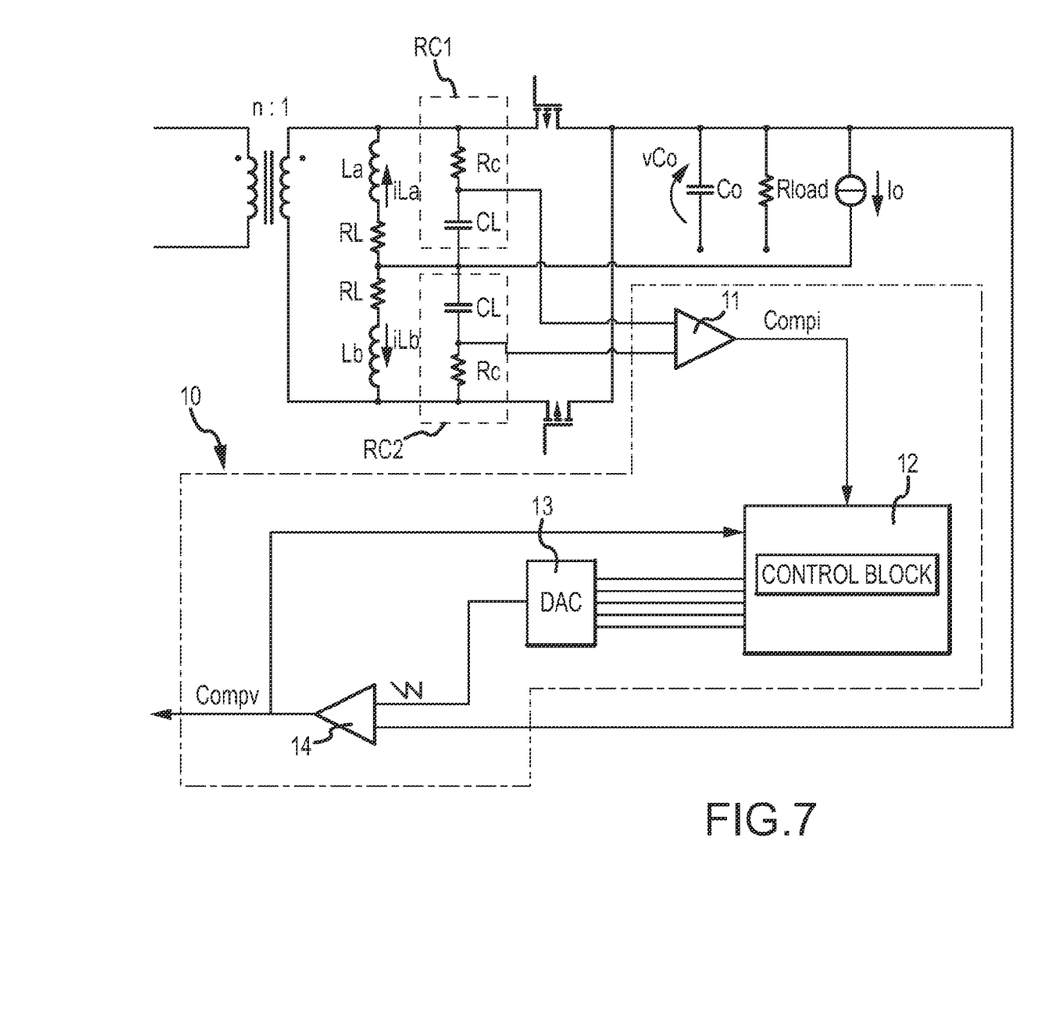
FIG. 7 schematically shows a digital controller according to an embodiment of the invention.
Figure 8:
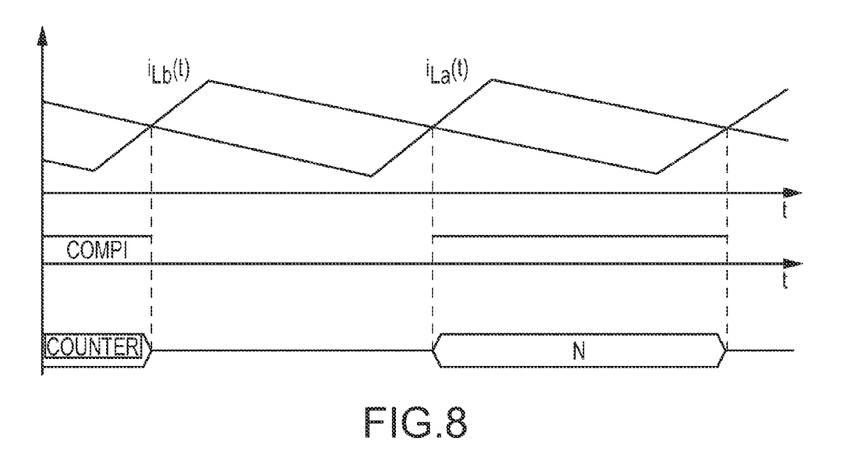
FIGS. 8 and 9 schematically show the pattern of wave forms relative to the controller of FIG. 7 according to an embodiment of the invention.

If then, referring to FIG. 7, these two nodes are brought at the input of a comparator 11 and, in a switching period, the time is measured wherein the output of the comparator 11 is high or low, under conditions of equal current, it will follow that the comparator 11 will have high output for half of the time. Thus, by controlling, with a counter, this duration, an indirect measure of the difference of the two mean currents follows. Referring to FIG. 8, the wave forms describing the current sharing control are shown.

In particular, the comparator 11 exhibits respective input terminals connected to intermediate circuit nodes of a pair of RC networks, namely RC1 and RC2, in turn connected in parallel to output inductances La, Lb of the converter 1.

Referring again to FIG. 7, the digital controller 10 according to an embodiment of the invention comprises a further comparator 14 output connected to a control block 12 and a D/A converter 13 connected between the control block 12 and the comparator 14.

In this way, a method for controlling the Full Bridge converter with a Current-Double is obtained, the method comprising essentially the steps of:

detecting a reference value;

comparing, instant by instant, the reference value with an output voltage value of the converter 1; and carrying out a switching from a transfer phase to an energy recirculation phase in correspondence with instants when the output voltage value reaches the reference value.

In particular, the energy recirculation phase comprises a turning-on step of the control transistors (Q1, Q2 and Q3, Q4) of the converter 1, in an alternate way in correspondence with the half-bridges S1 and S2.

Advantageously, the switch step is carried out in an asynchronous way with respect to the converter clock signal.

Moreover, the method comprises a further switch step from the energy recirculation phase to the transfer phase, carried out in a synchronous way with respect to the converter clock signal.

Also, the comparison step provides information related to the difference between the currents flowing in inductances of said Current-Doubler, which is used to regulate a reference voltage provided to the D/A converted 13. In particular, this information is provided during two consecutive energy transfer periods, in a differential way, in order to regulate the difference between the currents.

The current sharing dynamics have a single pole linked to the inductances. The closed loop current-sharing can be thus compensated in a digital way by inserting another pole in the origin to have null error under steady conditions, and a zero to ensure the stability. A digital regulator PI will thus be used.

To decrease the difference between the two currents, the level of the reference D/A converter is increased or decreased in a differential way during both the energy transfer periods, which means increasing or decreasing the duration of the same. In this case the regulator is able to supply discrete reference voltage levels, as much more frequent as much resolved the DAC is.

Figure 9:
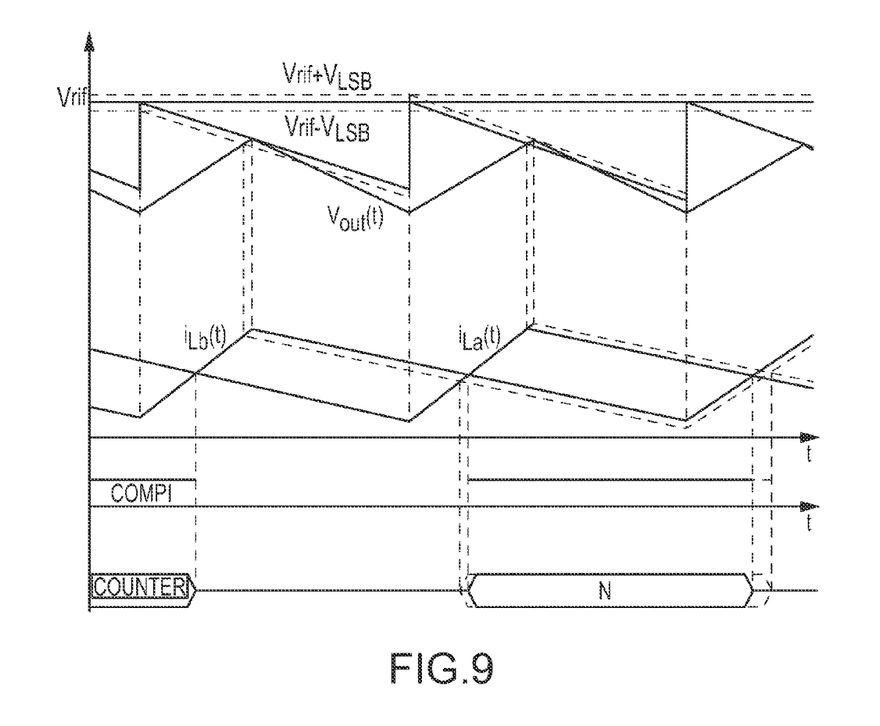
Figure 10:
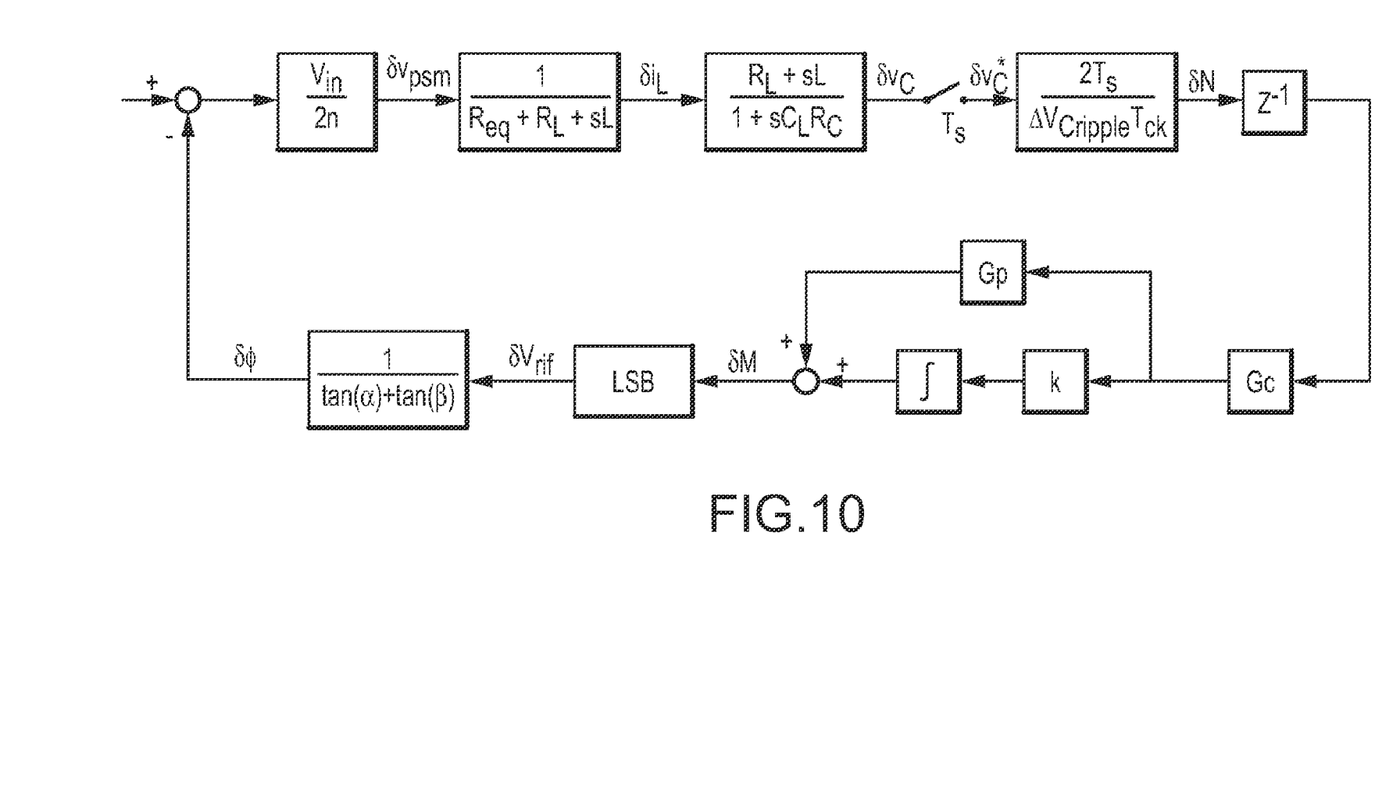
FIG. 10 schematically shows, in blocks, the operation principle of the digital controller of FIG. 7 according to an embodiment of the invention.

In order not to have evident limit cycles it is necessary that the information coming from the counter relative to a null difference between the two currents, can be obtained with at least two reference voltage levels. In relation to the wave forms in FIG. 9 this would correspond to considering the current readings, which are obtained with the reference equal to $V_{rif}$, as being equal to each other and having a value of $V_{rif} \pm V_{LSB}$. This feature imposes a limit to the controllable minimal difference between the currents, which depends on the LSB width. In other words, the necessary condition so as not to create limit cycles is that the two adjacent reference voltage levels (i.e. having a distance of an LSB), do not affect the difference between the currents in such a way as to make the control intervene. Making reference to FIG. 10, this imposes that a unitary variation of $\delta M$ corresponds to a variation of $\delta N < 1$ (being an entire number it means $\delta N = 0$):

$$V_{LSB} < V_{LSB,teorico} = (\tan\alpha + \tan\beta)\frac{2n}{V_{in}}\frac{R_{eq} + R_L}{R_L}\frac{\Delta V_{ripple}T_{ck}}{2T_s} \quad (4)$$

where $\Delta V_{Cripple}$ is the value of the voltage ripple on each capacitor of the current reading network, as shown hereafter.

In reality, the same effect can be obtained also with a higher LSB, by introducing a dead area in the digital control algorithm, whose effect is that of blocking the control action in the case the steady condition is near.

Once a highest acceptable value is chosen for the current difference in the inductances of the Current Doubler, not resulting in any control action, the value of $V_{LSB}$ is given by:

$$V_{LSB} = (\tan\alpha + \tan\beta)\frac{2n}{V_{in}}(R_{eq} + R_L)\delta i_L \quad (5)$$

To obtain the desired LSB value and to maintain the slope determined for the compensation ramp, it is necessary to use a D/A converter with a number of bits equal to:

$$N_{bit} = \log_2\left(\frac{\tan\beta}{V_{LSB}}\right) \quad (6)$$

To realize the dead area in the control algorithm it is necessary to choose the gain of the proportional algorithm of the digital filter.

$$K_p = G_c \cdot G_p = \frac{1}{2^M} \quad (7)$$

where $$M = \log_2\left(\frac{V_{LSB}}{V_{LSB,theoretical}}\right)$$

The values of $V_{LSB}$ e $V_{LSB, theoretical}$ are those calculated in equations (4) and (5), while Gc and Gp are the multiplication factor of the digital filter and the proportional gain term, shown in FIG. 10.

The gain $G_c$ is still to be evaluated which affects the integral action of the digital filter. Such value strongly affects the control stability. To evaluate it precisely it is necessary to study the transfer function $G_{loop,i}(z)$, by evaluating its diagrams of Bode and the root locus when the $G_c$ varies. The criterion to be followed for the sizing is that of obtaining a phase margin higher than 60°, without reducing the control closed loop band too much.

The study of the reactioned system allows the calibration of the digital filter PI. The block scheme of the current sharing loop is shown in FIG. 10.

The first two blocks show the effect a difference between the phase shift causes on the difference of the currents in the Current-Doubler inductors. The dynamics are, according to a first approximation, orthogonal to that of common mode responsible for the variation of the output voltage. The transfer function between control variable and difference of currents is:

$$G_{i\phi}(s) = \frac{\delta i(s)}{\delta \phi(s)} = \frac{V_{in}}{2N}\left(\frac{1}{R_{eq} + R_L + sL}\right) \quad (8)$$

where $$R_{eq} = \frac{2L_r f_{sw}}{n^2}$$

The reading of the difference between the currents occurs as previously described and it can be assimilated to an all-pass filter with a pole and a zero, as much closer as much similar the time constants $L/R_L$ e $C_L R_C$ are:

$$\frac{\delta v_C(s)}{\delta i_L(s)} = \frac{R_L + sL}{1 + sC_L R_C} = R_L \quad (9)$$

Downstream this stage the comparison occurs between the voltages representing the currents in the inductors. Against a variation between such voltages, the wave form at the output of the comparator will remain at the high logic level for a greater or smaller period of the amount:

$$\delta t = \frac{2T_s}{\Delta V_{Cripple}}\delta v_C \quad (10)$$

where $\Delta V_{Cripple}$ is the voltage ripple value on each capacitor of the current reading network. If the time constants $L/R_L$ and $C_L R_C$ are equal, the voltage ripple is equal to:

$$\Delta V_{Cripple} = R_L \cdot \Delta I_{Lripple} \quad (11)$$

The period wherein the comparator output remains at high level it is measured by a counter, which works at the controller clock frequency. This latter should be much higher than the switching frequency so that the numeric value provided by the counter has a good resolution. From the value N determined by the counter the value corresponding to half of the switching period is deducted. In the pattern of small signal this operation is described by a variation of the value of N against a variation of t equal to:

$$\delta N = \frac{\delta t}{T_{ck}} \quad (12)$$

The numeric value obtained is processed by the digital filter by means of two algorithms. The first supplies a value proportional to $\Box$N, by means of the constant GC. The second is realized by means of a register which is increased or decreased by $\Box$1 on the basis of the counter having detected a value of N higher or lower than the reference. In this way an integral action is obtained which allows nullifying the error under steady conditions.

Even the integral control is regulated by means of a multiplication term, identified with K. In reality, as for how the integration algorithm is implemented, that the multiplication term K depends on the width of δN at the input. In particular the increasing and decreasing action of the register can be described by means of the coefficient:

$$K(\delta N) = \frac{1}{\delta N} \text{ for } \delta N \neq 0$$

$$K(\delta N) = 0 \text{ for } \delta N = 0 \tag{13}$$

From these relations it follows that the strongest integral action occurs in correspondence with the minimal value of $\delta N$, i.e. $\delta N = \pm 1$. The transfer function in the domain z is represented by:

$$H(z) = G_c\left(G_p + \frac{K \cdot z}{z-1}\right) \tag{14}$$

which for K=1 corresponds to $$H(z) = G_c\left(\frac{(G_p + 1)z - G_p}{z-1}\right) \tag{15}$$

The equations (14) and (15) represent the sum of the integral and proportional contributions. The resulting transfer function has a pole with null frequency and a zero.

At the output of the filter a numeric value is obtained which is used to decide the starting voltage of the ramps performing the control of the voltage peak in the two energy transfer intervals. From the point of view of the analysis of small signal, a variation of the value at the output of the digital filter, indicated with $\delta M$, causes a variation of the reference of a multiple of the LSB of the DAC, equal to:

$$\delta V_{rif} = -\delta M \cdot V_{LSB} \tag{16}$$

The negative term means that the reference of the ramp relative to the half-period wherein the energy transfer excess had occurred is decreased. The control action occurs in the switching period subsequent to that wherein the difference between the currents $i_{La}$ and $i_{Lb}$ has been measured. For taking this delay term into consideration, a multiplication factor $z^{-1}$ is introduced in the calculation of $G_{loop}(z)$.

Figure 11:
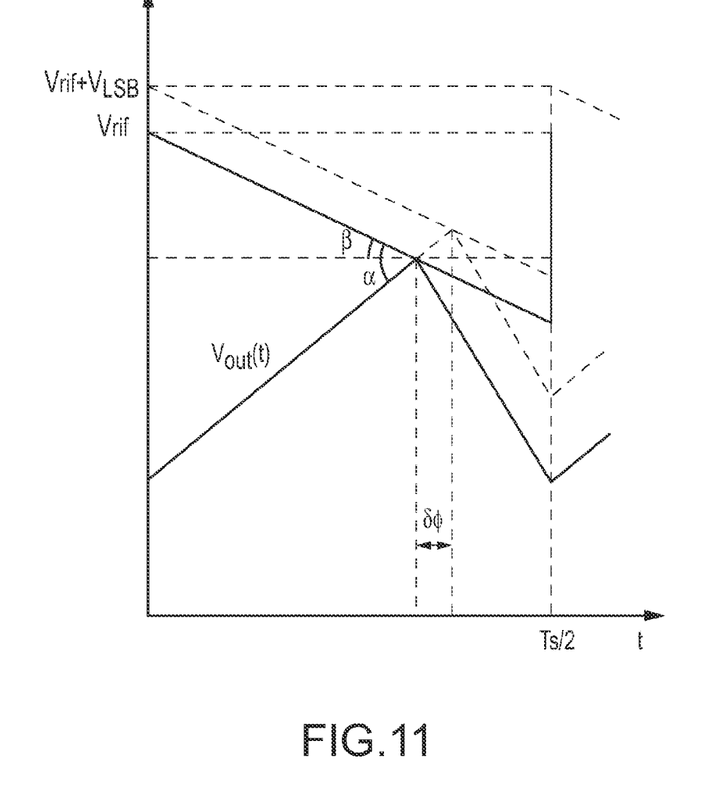
FIG. 11 schematically shows the pattern of wave forms relative to the controller of FIG. 7 according to an embodiment of the invention.

To be able to close the loop a last term is missing, which represents the gain between $\delta V_{rif}$ and $\delta \phi$, which can be calculated geometrically from the analysis of FIG. 11.

$$\frac{\delta \phi}{\delta V_{rif}} = \frac{1}{\tan(\alpha) + \tan(\beta)} \tag{17}$$

where $\tan(\alpha)$ is given by (2) and $\tan(\beta)$ is the slope of the compensation ramp.

The analysis of the stability of the reactioned system has been realized once again in the domain z. The transfer function between the control variable ☐☐ and the current difference, represented by the voltage reading ☐vC, has been quantized for taking into consideration that the reading of the currents occurs once for cycle. This corresponds to a sampling of the variable ☐vC with frequency fsw.

The expression of the loop gain can be obtained from the previous equations and it is as follows:

$$G_{loop,i} = -\frac{1}{z}H(z) \cdot G_{vc\phi}(z) \cdot V_{LSB}\left(\frac{1}{\tan(\alpha) + \tan(\beta)}\right)\left(\frac{2T_s}{R_L \cdot \Delta I_{Lripple}T_{ck}}\right) \tag{18}$$

The coefficient K expresses in (13) will be always considered of unitary value, since in this way the worst case for the loop stability is supposed, corresponding to the most intense integral action.

Advantageously according to an embodiment of the invention, the digital controller allows to implement useful additional functions with respect to two main control functions of the peak voltage and current-sharing regulation. It is the protection against overcurrent in the Current-Doubler inductances and the fine regulation of the output voltage.

During all the converter operation conditions, and especially during the transients, the existence of a protection mechanism against overcurrent is necessary, which interrupts the energy transfer to the load.

The voltage signals used for the current sharing indicate, instant by instant, the current value in the Current-Doubler inductances. By comparing each of these signals with a voltage reference equivalent to the highest current provided for each winding, a signal is obtained which can be used for instantaneously interrupting the energy transfer.

Figure 12:
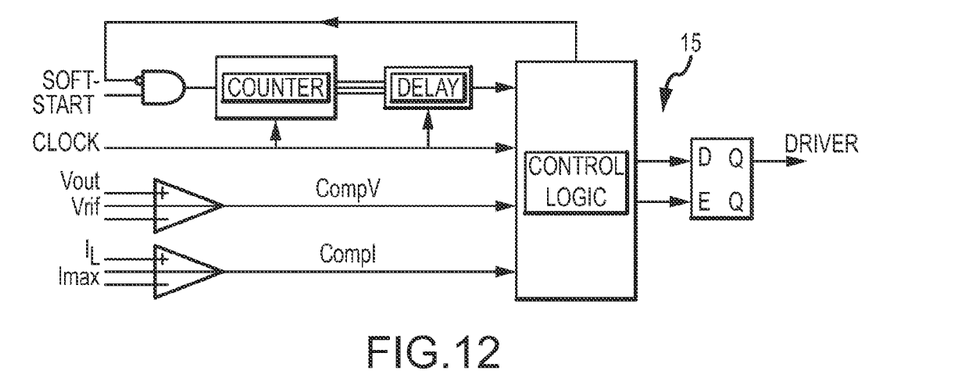
FIG. 12 shows, in greater detail, a portion of the controller of FIG. 7 according to an embodiment of the invention.
Figure 13:
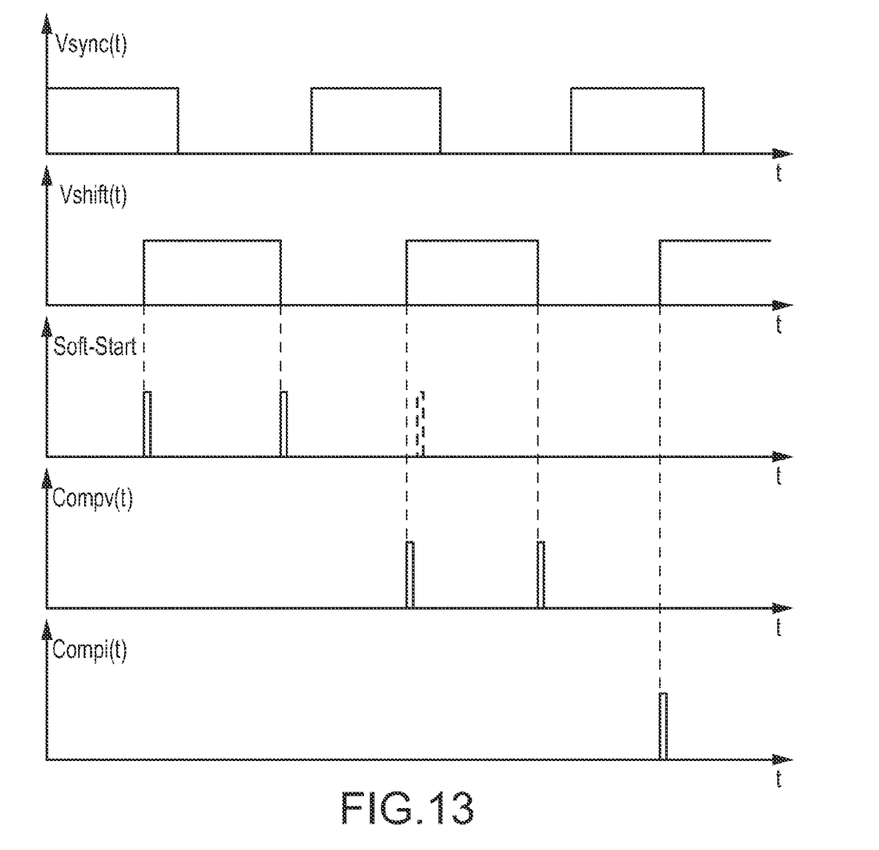
FIGS. 13 and 14 schematically show the progress of wave forms relative to the portion of FIG. 12 according to an embodiment of the invention.

As shown in FIG. 12, this signal is treated by the control logic 15 as those coming from the output voltage regulation and from the Soft-Start. Once again, inside each half-period, the first signal which is affirmed determines the start of the recirculation phase. FIG. 13 exemplifies the wave forms typical of this control strategy. The control logic 15 is also suitable to interrupt an output energy transfer in case of overcurrent.

Figure 14:
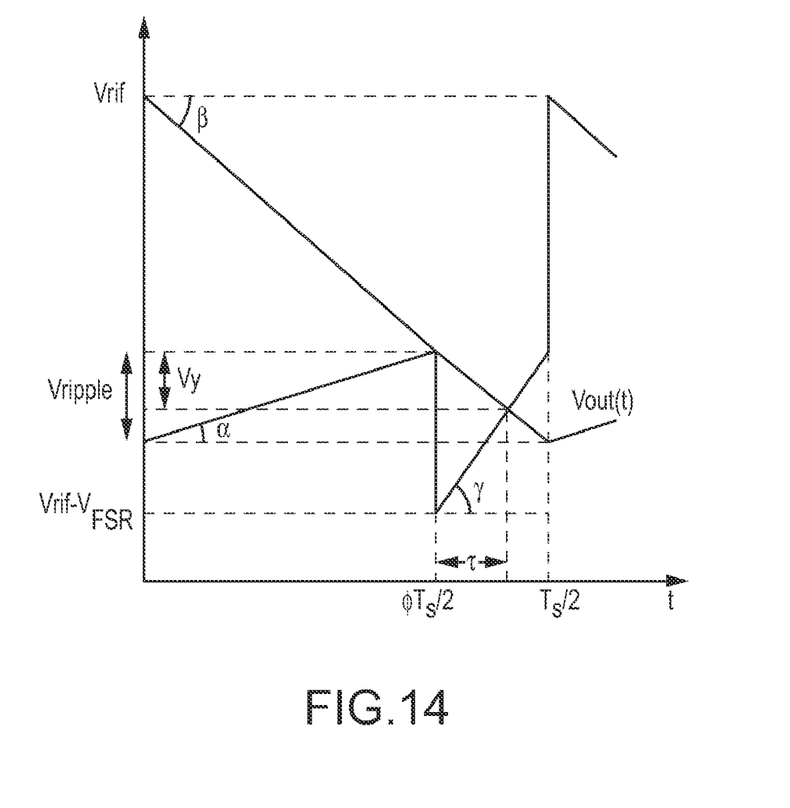

The voltage control above described regulates the peak value of the output voltage. The corresponding mean value depart therefrom of an amount equal to half the output voltage ripple. To try and eliminate any type of error known a priori a fine regulation algorithm of the output voltage has been realized. The corresponding waveforms are shown in FIG. 14.

This type of calibration is carried out only once, at the turn-on of the controller after the Soft-Start phase. The realization is carried out by means of an estimate of the voltage ripple below the hypothesis that the converter has a very low output impedance under all the operative conditions. It follows that the phase shift between the half-bridges does not vary that much between the high or low load conditions. It is to be noted that also the voltage ripple does not depend, according to a first approximation, on the load.

Accordingly, the control method according to an embodiment of the invention comprises a step of fine regulation of the output voltage by means of an algorithm performing an estimation of a ripple measure of this output voltage by generating voltage reference signals.

The ripple estimate is realized with the following strategy: when the signal Compv(t) is affirmed, the DAC is sent to the highest output dynamics, equal to $V_{FSR}$, and it is made to perform a predetermined positive slope ramp equal to $\tan(\gamma)$. With reference to FIG. 14 the value of the voltage ripple can be obtained through the relation:

$$V_{ripple} = \frac{V_y(1-\phi)\frac{T_s}{2}}{\tau} \tag{19}$$

where τ is calculated from the measure of the duration of the signal Compv(t)=1 and $V_y$ is calculated as:

$$V_y = V_{FSR} - \tan(\beta) \cdot \phi \cdot \frac{T_s}{2} - \tan(\gamma) \cdot \tau \quad (20)$$

The algorithm performs the ripple measure until, for three consecutive intervals, the same value is obtained. This allows avoiding the situation where a single measure, possibly affected by disturbances, supplies a non reliable value. Further the reference voltage is regulated so that the mean voltage is equal to:

$$\overline{V}_{out} = V_{rif} - \tan(\beta) \cdot \phi \cdot \frac{T_s}{2} - \frac{1}{2} V_{ripple} \quad (21)$$

In conclusion, the control method and the digital controller according to an embodiment of the invention use the instants when the output voltage reaches the reference value to switch from a transfer phase to an energy recirculation phase and they realize, in such way, a peak voltage control.

Moreover, since the switches occur in a synchronous way with the occurrences of the reference overcoming by the output voltage, but in an asynchronous way with the system clock, having a discrete number of suppliable phase shifts and using a digital modulator PWM is avoided.

Still advantageously according to an embodiment of the invention, the switching from recirculation periods to energy transfer periods occurs instead in a synchronous way with the system clock, obtaining an absolutely fixed switch frequency.

Moreover, advantageously according to an embodiment of the invention, the proposed control method allows to obtain the highest speed of response to the transients. In particular, while in a control method of the analog voltage-mode type the sole thing which is decided is the phase shift between the waves PWM of the half-bridges, and thus the controller acts once for cycle, the controller based on the method according to an embodiment of the invention determines independently the durations of the two energy transfer periods, thus the controller acts at frequency $2f_s$.

The method according to an embodiment of the invention also provides a regulation of the difference between the currents, for ensuring that the currents in the two inductances in the Current-Doubler do not diverge, by using the RC networks, namely RC1 and RC2, connected at the input of the digital controller.

Finally, advantageously according to an embodiment of the invention, the digital controller implements the additional functions of protection against overcurrent in the Current-Doubler inductances and of fine regulation of the output voltage.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for controlling a Full Bridge converter with a Current-Doubler of the type comprising at least first and second half-bridges of diodes connected to respective control transistors, the method comprising the steps of:

detecting a reference value;
  comparing, instant by instant, the reference value with an output voltage value of the converter;
  carrying out, in an asynchronous way relative to a clock signal, a switching from a transfer phase to an energy recirculation phase in correspondence with instants when the output voltage value reaches the reference value; and
  carrying out, in a synchronous way relative to the clock signal, a switching from the energy recirculation phase to the energy transfer phase.

2. The control method of claim 1, wherein the switching from a transfer phase to an energy recirculation phase in correspondence with instants when the output voltage value reaches the reference value controls the peak value of an output voltage of the Full Bridge converter.

3. The control method of claim 1, wherein the energy recirculation phase comprises a turning-on step of control transistors of the converter.

4. The control method of claim 3, wherein the turning-on step of the control transistors is carried out in an alternate way in correspondence with the half-bridges.

5. A method for controlling a Full Bridge converter with a Current-Doubler of the type comprising at least first and second half-bridges of diodes connected to respective control transistors, the method comprising the steps of:

detecting a reference value;
  comparing, instant by instant, the reference value with an output voltage value of the converter;
  carrying out, in an asynchronous way relative to a clock signal, a switching from a transfer phase to an energy recirculation phase in correspondence with instants when the output voltage value reaches the reference value;
  carrying out, in a synchronous way relative to the clock signal, a switching from the energy recirculation phase to the energy transfer phase; and
  further comprising a step of fine regulation of an output voltage of the Full Bridge converter by means of an algorithm performing an estimation of a ripple measure of the output voltage by generating voltage reference signals.

6. A method for controlling a Full Bridge converter with a Current-Doubler of the type comprising at least first and second half-bridges of diodes connected to respective control transistors, the method comprising the steps of:

detecting a reference value;
  comparing, instant by instant, the reference value with an output voltage value of the converter;
  carrying out, in an asynchronous way relative to a clock signal, a switching from a transfer phase to an energy recirculation phase in correspondence with instants when the output voltage value reaches the reference value;
  carrying out, in a synchronous way relative to the clock signal, a switching from the energy recirculation phase to the energy transfer phase; and
  wherein the step of comparing, instant by instant, the reference value with an output voltage value of the converter also provides information related to the difference between the currents flowing in inductances of the Current-Doubler.

7. A method for controlling a Full Bridge converter with a Current-Doubler of the type comprising at least first and second half-bridges of diodes connected to respective control transistors, the method comprising the steps of:

detecting a reference value;
comparing, instant by instant, the reference value with an output voltage value of the converter;
carrying out a switching from a transfer phase to an energy recirculation phase in correspondence with instants when the output voltage value reaches the reference value;
wherein the step of comparing, instant by instant, the reference value with an output voltage value of the converter also provides information related to the difference between the currents flowing in inductances of the Current-Doubler; and
regulating a reference voltage provided to a D/A converter comprised in the Full Bridge converter by using the information related to the difference between the currents flowing in inductances of the Current-Doubler, the reference voltage being provided during two consecutive energy transfer periods, in a differential way, in order to regulate the difference between the currents.

8. A Full Bridge converter, comprising:
a Current-Doubler of the type comprising at least first and second half-bridges of diodes connected to respective control transistors;
a digital controller comprising:
at least one comparator having respective input terminals and output inductances; and
a pair of RC networks;
the input terminals of the comparator being connected to intermediate circuit nodes of the pair of RC networks in turn connected, in parallel, to output inductances of the converter;
a further comparator;
a control block;
wherein the further comparator has an output connected to the control block; and
a D/A converter connected between the control block and the further comparator.

9. The Full-Bridge converter of claim 8, further comprising a control logic suitable to interrupt an output energy transfer in case of overcurrent.

10. A method for controlling a Full Bridge converter with a Current-Doubler of the type comprising at least first and second half-bridges of diodes connected to respective control transistors, the method comprising the steps of:
detecting a reference value;
comparing, instant by instant, the reference value with an output voltage value of the converter;
carrying out a first switching from a transfer phase to an energy recirculation phase in correspondence with instants when the output voltage value reaches the reference value in order to control the peak value of the output voltage of the Full Bridge converter; and
carrying out a second switching from the energy recirculation phase to the transfer phase;
the first switch step being carried out in an asynchronous way with respect to a clock signal of the converter; and
the second switch step being carried out in a synchronous way with respect to a clock signal of the converter.

11. The control method of claim 10, wherein the energy recirculation phase comprises a turning-on step of the control transistors of the converter in an alternate way in correspondence with the half-bridges.

12. The control method of claim 10, wherein the step of comparing, instant by instant, the reference value with an output voltage value of the converter also provides information related to the difference between the currents flowing in inductances of the Current-Doubler.

13. The control method of claim 10, further comprising a step of fine regulation of an output voltage of the Full Bridge converter by means of an algorithm performing an estimation of a ripple measure of the output voltage by generating voltage reference signals.

14. A method for controlling a Full Bridge converter with a Current-Doubler of the type comprising at least first and second half-bridges of diodes connected to respective control transistors, the method comprising the steps of:
detecting a reference value;
comparing, instant by instant, the reference value with an output voltage value of the converter;
carrying out a first switching from a transfer phase to an energy recirculation phase in correspondence with instants when the output voltage value reaches the reference value in order to control the peak value of the output voltage of the Full Bridge converter; and
carrying out a second switching from the energy recirculation phase to the transfer phase;
the first switch step being carried out in an asynchronous way with respect to a clock signal of the converter; and
the second switch step being carried out in a synchronous way with respect to a clock signal of the converter;
wherein the step of comparing, instant by instant, the reference value with an output voltage value of the converter also provides information related to the difference between the currents flowing in inductances of the Current-Doubler; and
regulating a reference voltage provided to a D/A converter comprised in the Full Bridge converter by using the information related to the difference between the currents flowing in inductances of the Current-Doubler, the reference voltage being provided during two consecutive energy transfer periods, in a differential way, in order to regulate the difference between the currents.

15. A Full Bridge converter, comprising:
a Current-Doubler of the type comprising at least first and second half-bridges of diodes connected to respective control transistors;
a digital controller, comprising:
a first comparator having respective input terminals and output inductances;
a pair of RC networks;
a second comparator;
a D/A converter; and
a control block;
wherein the input terminals of the first comparator being connected to intermediate circuit nodes of the pair of RC networks in turn connected, in parallel, to the output inductances of the converter;
wherein the second comparator having an output connected to the control block; and
wherein the D/A converter being connected between the control block and the second comparator.

16. A Full Bridge converter, comprising:
a Current-Doubler of the type comprising at least first and second half-bridges of diodes connected to respective control transistors;
a digital controller, comprising:
a first comparator having respective input terminals and output inductances;
a pair of RC networks;
a second comparator;
a D/A converter; and
a control block;
wherein the input terminals of the first comparator being connected to intermediate circuit nodes of the pair of RC networks in turn connected, in parallel, to the output inductances of the converter;

wherein the second comparator having an output connected to the control block; and wherein the D/A converter being connected between the control block and the second comparator; and wherein the Full Bridge converter further comprises control logic suitable to interrupt an output energy transfer in case of overcurrent.

* * * * *